(12) United States Patent
Abouelwafa

(10) Patent No.: US 11,693,565 B2
(45) Date of Patent: Jul. 4, 2023

(54) STORAGE VOLUME SYNCHRONIZATIONS RESPONSIVE TO COMMUNICATION LINK RECOVERIES

(71) Applicant: HEWLETT PACKARD ENTERPRISE DEVELOPMENT LP, Houston, TX (US)

(72) Inventor: Ayman Abouelwafa, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/444,776

(22) Filed: Aug. 10, 2021

(65) Prior Publication Data

US 2023/0049823 A1 Feb. 16, 2023

(51) Int. Cl.
G06F 3/06 (2006.01)

(52) U.S. Cl.
CPC ............ G06F 3/0619 (2013.01); G06F 3/067 (2013.01); G06F 3/0622 (2013.01); G06F 3/0659 (2013.01)

(58) Field of Classification Search
None
See application file for complete search history.

(56) References Cited

U.S. PATENT DOCUMENTS

| | | | |
|---|---|---|---|
| 5,835,954 A | 11/1998 | Duyanovich et al. | |
| 6,108,748 A * | 8/2000 | Ofek | G11B 19/02 |
| | | | 711/E12.083 |
| 6,823,349 B1 * | 11/2004 | Taylor | G06F 11/2082 |
| 7,024,527 B1 | 4/2006 | Ohr | |
| 7,143,308 B2 | 11/2006 | Tseng et al. | |
| 7,305,579 B2 | 12/2007 | Williams | |
| 7,546,485 B2 | 6/2009 | Cochran et al. | |
| 8,112,665 B1 | 2/2012 | Somavarapu et al. | |
| 8,200,921 B2 * | 6/2012 | Cochran | G06F 11/2082 |
| | | | 711/162 |

(Continued)

OTHER PUBLICATIONS

Warmuth et al., "DS8870 Data Migration Techniques", RedBooks, IBM, First Edition, Apr. 2015, 300 pages.

(Continued)

*Primary Examiner* — Edward J Dudek, Jr.
*Assistant Examiner* — Ralph A Verderamo, III
(74) *Attorney, Agent, or Firm* — Trop, Pruner & Hu, P.C.

(57) ABSTRACT

In some examples, a system detects recovery, from an unavailable state, of a communication link between a first storage system that includes a first storage volume and a second storage system that includes a second storage volume that is to be a synchronized version of the first storage volume, where while the communication link is in the unavailable state the second storage volume is in an offline state and the first storage volume is in an online state. In response to detecting the recovery of the communication link, the system sends a first tracking metadata for the first storage volume from the first storage system to the second storage system, and in response to receipt of the first tracking metadata at the second storage system that maintains a second tracking metadata for the second storage volume, the system transitions the second storage volume from the offline state to a controlled online state, and initiates a synchronization process to synchronize the second storage volume with the first storage volume.

19 Claims, 8 Drawing Sheets

(56) References Cited

U.S. PATENT DOCUMENTS

| | | |
|---|---|---|
| 8,214,612 B1 | 7/2012 | Natanzon |
| 8,225,138 B2 | 7/2012 | Oxrieder et al. |
| 8,655,848 B1 | 2/2014 | Leverett et al. |
| 8,904,133 B1 | 12/2014 | Suzuki et al. |
| 9,026,696 B1 | 5/2015 | Natanzon et al. |
| 9,459,804 B1 | 10/2016 | Natanzon et al. |
| 9,639,277 B2 | 5/2017 | Nakajima |
| 10,228,962 B2 | 3/2019 | Dornemann et al. |
| 10,241,712 B1 | 3/2019 | Elliott et al. |
| 10,353,640 B2 | 7/2019 | Venkat et al. |
| 10,402,113 B2 | 9/2019 | Ray et al. |
| 10,452,503 B2 | 10/2019 | Abouelwafa et al. |
| 10,705,927 B2 | 7/2020 | Killamsetti et al. |
| 10,768,851 B2 | 9/2020 | Vokaliga et al. |
| 10,776,224 B2 | 9/2020 | Chen et al. |
| 10,956,079 B2 | 3/2021 | Killamsetti et al. |
| 10,972,335 B2 | 4/2021 | Rajvaidya et al. |
| 2004/0260873 A1 | 12/2004 | Watanabe |
| 2005/0071708 A1* | 3/2005 | Bartfai ............... G06F 11/2064 714/E11.102 |
| 2005/0193180 A1 | 9/2005 | Fujibayashi |
| 2010/0017573 A1 | 1/2010 | Shinozaki et al. |
| 2011/0238937 A1 | 9/2011 | Murotani et al. |
| 2012/0278567 A1 | 11/2012 | Broido et al. |
| 2013/0042082 A1* | 2/2013 | Tamura ............... G06F 11/2082 711/E12.001 |
| 2017/0132095 A1 | 5/2017 | Graefe |
| 2018/0032257 A1* | 2/2018 | Xiang ..................... G06F 3/067 |
| 2019/0065382 A1 | 2/2019 | Velayuthaperumal et al. |
| 2019/0349427 A1 | 11/2019 | Rago et al. |
| 2020/0183601 A1 | 6/2020 | Tamma et al. |
| 2021/0026673 A1 | 1/2021 | Forney |
| 2021/0026867 A1 | 1/2021 | Meiri et al. |
| 2021/0109827 A1 | 4/2021 | Vokaliga et al. |
| 2021/0357132 A1 | 11/2021 | Kumar et al. |
| 2021/0374155 A1* | 12/2021 | Xiang ................ G06F 11/2097 |

OTHER PUBLICATIONS

Dell; "Dell EMC Unity: Replication Technologies"; Jan. 2021; 80 pages.

George P, et al., "Bitmap and delta sync," 2015, myZerto (website), <https://www.zerto.com/myzerto/forums/topic/bitmap-and-delta-sync/> (2 pages).

IBM; "Metro Mirror and Global Mirror"; printed on Apr. 29, 2021 from webpage: https://www.ibm.com/docs/en/flashsystem-9x00/8.3.1?topic=csf-metro-mirror-global-mirror; 5 pages.

Infinidat.com; "Replication Overview"; printed on Apr. 29, 2021 from webpage: https://support.infinidat.com/hc/en-us/articles/360002108377-Overview-of-replication; 15 pages.

Zerto Ltd., "VPG Statuses and Synchronization Triggers," Excerpt from Zerto Virtual Manager Administration Guide: VMware vSphere Environment. Chapter 9: Managing VPGS, 2015, pp. 1-2, 156-161, <https://www.zerto.com/myzerto/wp-content/uploads/2015/10/Zerto-Virtual-Manager-vSphere-Administration-Guide.pdf>.

Linux, Asymmetric Logical Unit Assignment, The Linux SCSI Target Wiki last modified on Oct. 9, 2013, 6 pages.

OpenStack Docs: "Dell EMC VNX driver", printed on: Oct. 23, 2020 from webpage: https://docs.openstack.org/clinder/queens/configuration/block-storage/drivers/dell-emc-vnx-driver.html; 22 pages.

Infinidat, "Active-Active replication—INFINIDAT Support," Feb. 27, 2021, <https://web.archive.org/web/20210227025847/https://supportinfinidat.com/hc/en-us/articles/360002108357>.

* cited by examiner

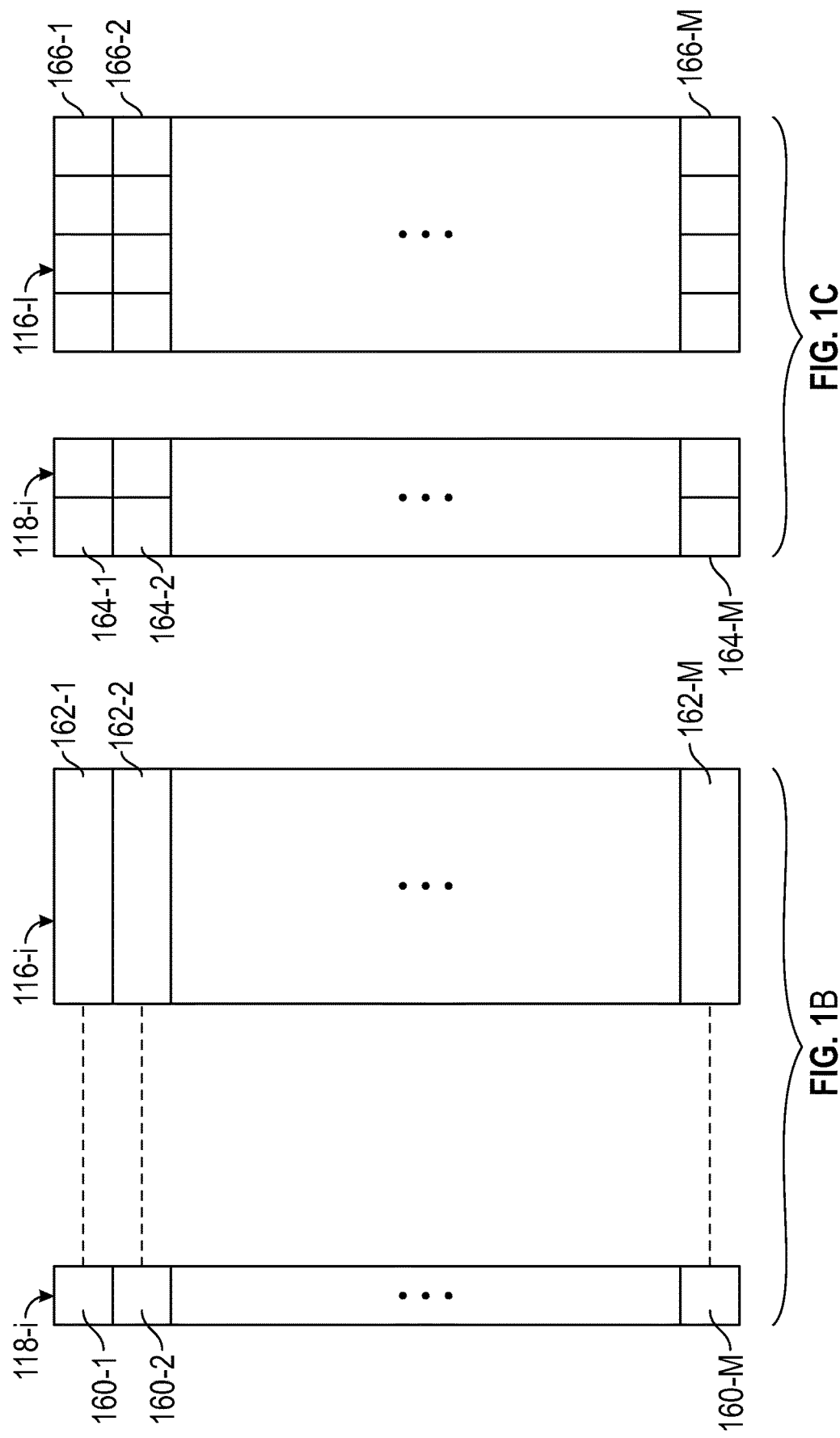

STORAGE VOLUME SYNCHRONIZATIONS RESPONSIVE TO COMMUNICATION LINK RECOVERIES

BACKGROUND

A storage system is used to store data for a computing device or multiple computing devices. In some examples, the storage system can be directly connected to a computing device. In other examples, the storage system is accessible over a network by a computing device.

BRIEF DESCRIPTION OF THE DRAWINGS

Some implementations of the present disclosure are described with respect to the following figures.

FIGS. 1B and 1C are block diagrams of tracking metadata according to some examples.

Figure 1A:
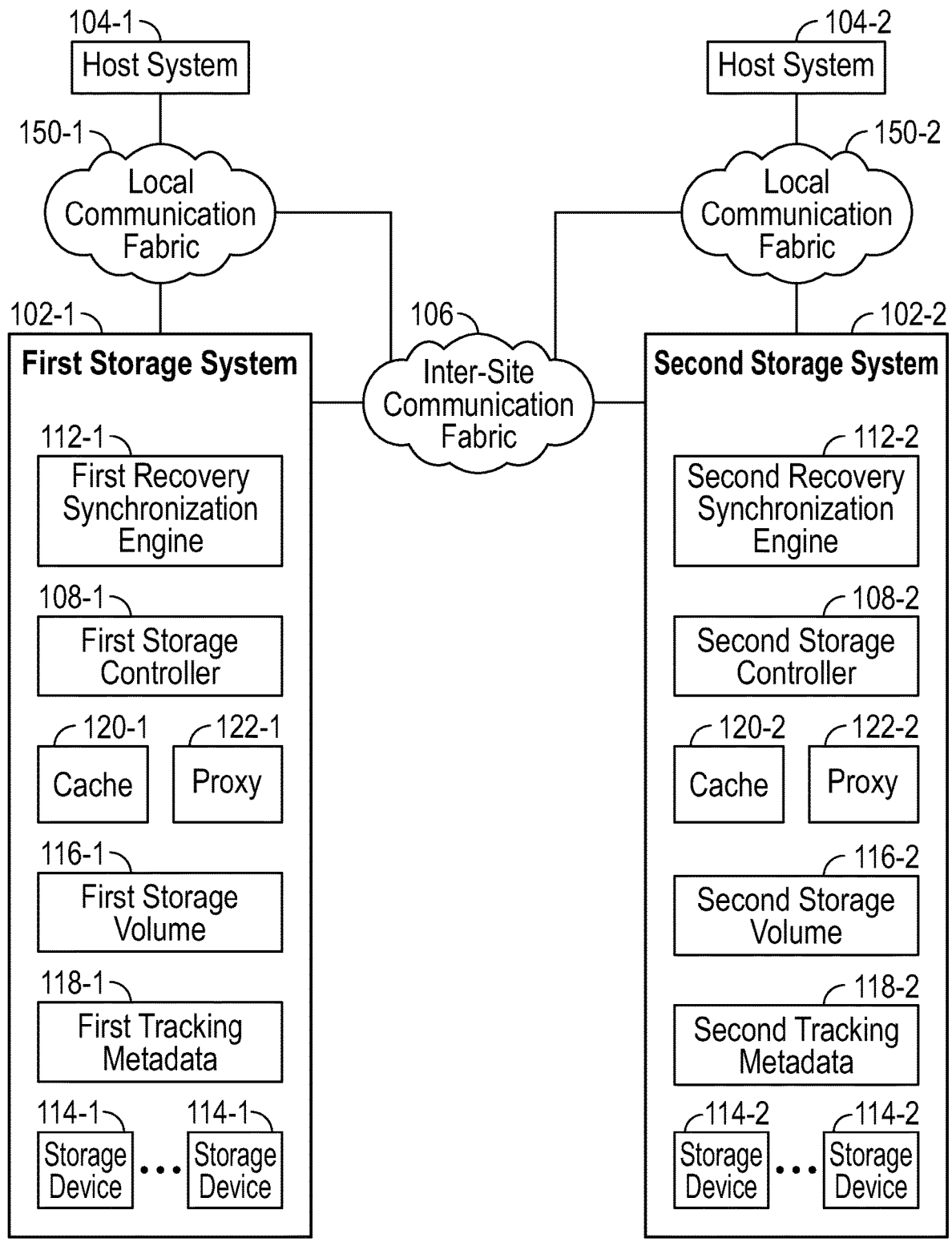
FIG. 1A is a block diagram of an arrangement that includes storage systems that store storage volumes to be synchronized, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A storage system can include a storage device or a collection of multiple storage devices. Examples of storage devices include disk-based storage devices, solid-state storage devices, and so forth. A storage system can also be referred to as a "storage array" that includes a storage device or multiple storage devices.

In some cases, data can be stored in a collection of storage volumes. A "storage volume" can refer to a logical container of data, where the storage volume can be stored in a storage device or across multiple storage devices. In some examples, a storage volume can be identified as by a logical unit number (LUN) or another type of identifier.

For data redundancy or protection, copies of the same data can be maintained in multiple storage volumes at different storage systems. For example, a replica of data in a first storage volume at a first storage system can be stored in a second storage volume at a second storage system. More generally, a collection of storage volumes (including two or more than two storage volumes) can maintain copies of the same data, so that data recovery is possible in case of data loss or data error at a storage volume in the collection.

In some examples, the storage volumes of the collection of storage volumes have an active-active arrangement in which each storage volume in the collection is "active," i.e., a host system can access the data in the active storage volume. The active storage volumes of the collection remain synchronized with respect to one another so that an update of data in a first storage volume is synchronized with the other storage volume(s) in the collection, and vice versa.

A collection of storage volumes that are synchronized and that remain active for host system accesses can be referred to as an "active-active synchronized collection of storage volumes."

A "host system" can refer to any electronic device that is able to read and/or write data. Examples of electronic devices include any or some combination of the following: a supercomputer, a desktop computer, a notebook computer, a tablet computer, a server computer, a storage controller, a communication node, a smart phone, a game appliance, a vehicle, a controller in a vehicle, a household appliance, and so forth.

A host system can issue an input/output (I/O) request to access data in a storage volume. An I/O request issued by a host system can be a read request to read data in a storage volume, or a write request to write data in a storage volume.

In some cases, storage volumes of an active-active synchronized collection of storage volumes can be at storage systems located at different geographic sites. For example, a first geographic site may include a first data center or any other type of computing environment, and a second geographic site can include a second data center or any other type of computing environment.

Synchronization of the storage volumes of the active-active synchronized collection is maintained across an inter-site communication link between the storage systems. The inter-site communication link can include a local area network (LAN), a wide area network (WAN), a public network such as the Internet, a storage area network (SAN), or any other type of communication link, which can be a wired link and/or a wireless link.

Depending on the location of a given host system, the given host system may be able to access data with less latency from a first storage volume in the active-active synchronized collection than from a second storage volume in the active-active synchronized collection. In an example where the first storage volume is in a first data center and the second storage volume is in a second data center, a first host system in the first data center is able to access data in the first storage volume with less latency than from the second storage volume, and a second host system in the second data center is able to access data in the second storage volume with less latency than from the first storage volume.

More generally, different host systems can access different storage volumes of the active-active synchronized collection, depending upon a proximity of the host systems to corresponding storage volumes in the active-active synchronized collection. During normal operation of the active-active synchronized collection (e.g., each storage volume in the active-active synchronized collection is available and/or an inter-site communication link is operational), a first host system may access a first storage volume that is in closer proximity to the first host system, while a second host system may access a second storage volume that is in closer proximity to the second host system. The first host system would normally not attempt to access the second storage volume, and the second host system would normally not attempt to access the first storage volume, as such accesses are considered non-optimal accesses due to the higher latency between the first host system and the second storage volume, and between the second host system and the first storage volume. However, if a path between the first host system and the first storage volume were to fail, then the first host system would attempt to access the second storage volume over a non-optimal path (and similarly for the second host system and the second storage volume), as discussed further below.

As used here, a "proximity" of a host system to a storage volume can refer to a relative amount of the latency experienced by the host system when accessing data in the storage volume. A host system is in closer proximity to a first storage volume if the latency experienced by the host system in accessing data in the first storage volume is less than a latency in accessing data of another storage volume. The proximity of a host system to a storage volume can be set up (e.g., manually or in an automated manner) at the host system or at a storage system (e.g., using a flag or another indicator at the storage system if the host system can read the flag or other indicator).

In the present discussion, for any given storage volume, reference is made to a "local" host system and a "remote" host system. A local host system for the given storage volume is a host system that is in closer proximity to the given storage volume than another storage volume. A remote host system for the given storage volume is a host system that is in less proximity to the given storage volume than another storage volume.

Generally, a storage volume of an active-active synchronized collection of storage volumes is normally accessed by local host systems, and not accessed by remote host systems (unless an abnormality occurs, where the abnormality can be due to a storage volume not being available such as due to failure or an error, a communication link being down, and so forth).

If an inter-site communication link between storage systems goes down, then synchronization of storage volumes in an active-active synchronized collection of storage volumes will no longer be possible over the communication link. In such a scenario, to ensure data consistency, just one storage volume in the active-active synchronized collection would be designated to be the online storage volume, while the remaining storage volume(s) in the active-active synchronized collection is (are) designated offline. An offline storage volume is a storage volume that is inaccessible to host systems. In this way, any updates of data in the storage volume of the active-active synchronized collection of storage volumes would be performed with respect to just the one storage volume. The choice of which storage volume is active can be performed by another entity.

Although reference is made to storage volumes of the active-active synchronized collection in the present discussion, it is noted that an active-active synchronized collection can include multiple groups of storage volumes, where a "group" of storage volumes can include one storage volume or multiple storage volumes. When an inter-site communication link becomes unavailable, one group of storage volumes can be designated the online group, while another group of storage volumes can be designated the offline group.

When the communication link between storage systems recovers, synchronization is performed between the storage volumes of the active-active synchronized collection of storage volumes. The synchronization of the storage volumes in the active-active synchronized collection may take a relatively long period of time, depending on the amount of data to be synchronized and the speed of the communication link.

Thus, if an offline storage volume that is being resynchronized remains offline for the duration of the synchronization process, then the offline storage volume may remain unavailable for a relatively long period of time. As a result, remote host systems would have to continue to access the online storage volume over a communication path that can exhibit relatively high latency, which can reduce read and write access performance of the remote host system.

In accordance with some implementations of the present disclosure, a storage volume of synchronized storage volumes at different storage systems is transitioned from an online state to an offline state in response to a communication link between the storage systems becoming unavailable. In response to recovery of the communication link, a first tracking metadata for an online storage volume maintained at a first storage system is sent from the first storage system to a second storage system that maintains a second tracking metadata for an offline storage volume. In response to receipt of the first tracking metadata at the second storage system, the second storage volume is transitioned to the online state (this is a "controlled" online state) even while the second storage volume is unsynchronized with respect to the first storage volume and while a synchronization process is performed between the first and second storage volumes. A "controlled" online state refers to a state where not all data in a storage volume is accessible; as discussed below, state data in the storage volume transitioned to the controlled online state would not be accessible, but would be redirected (proxied).

By transitioning the second storage volume from the offline state to the controlled online state in response to receipt of the first tracking metadata from the first storage system, the second storage system is able to allow "immediate" access to the second storage volume. As used here, "immediate" access to the second storage volume refers to an ability to access the second storage volume before the second storage volume becomes synchronized with changes of the first storage volume that occurred while the communication link between the first and storage systems was unavailable. Access of the second storage volume can occur while synchronization between the first and second storage volumes occurs in the background.

The second storage system can update the second tracking metadata based on the first tracking metadata received from the first storage system. Access of stale data in the second storage volume is prevented at the second storage system based on the updated second tracking metadata. "Stale" data in the second storage volume can refer to data in the second storage volume that has not yet been synchronized with corresponding data in the first storage volume by the background synchronization process.

FIG. 1A is a block diagram of an example arrangement that includes a first storage system 102-1 and a second storage system 102-2. Although just two storage systems are depicted in FIG. 1A, there may be more than two storage systems in other examples.

An inter-site communication fabric 106 is connected between the first and second storage systems 102-1 and 102-2. A "communication fabric" can refer to any type of communication network, such as a LAN, a WAN, a SAN, and so forth.

Host systems 104-1 and 104-2 are able to access data stored at a storage system 102-1 or 102-2 by issuing I/O requests to access data (read data and/or write data).

In some examples, the host system 104-1 is able to communicate with the first storage system 102-1 over a local communication fabric 150-1, and the host system 104-2 is able to communicate with the second storage system 102-2 over a local communication fabric 150-2.

The host system 104-1 is able to communicate with the second storage system 102-2 over the inter-site communication fabric 106, and the host system 104-2 is able to communicate with the first storage system 102-1 over the inter-site communication fabric. Generally, when the local communication fabrics 150-1 and 150-2 and the inter-site communication fabric 106 are operational and not exhibiting errors or other abnormalities, the host system 104-1 is able to access the first storage system 102-1 with lower latency than the second storage system 102-2, and the host system 104-2 is able to access the second storage system 102-2 with lower latency than the first storage system 102-1.

The first storage system 102-1 includes a first storage volume 116-1. Data of the first storage volume 116-1 can be stored across an array of storage devices 114-1 of the first storage system 102-1. The second storage system 102-2 includes a second storage volume 116-2. Data of the second storage volume 116-2 can be stored across an array of storage devices 114-1 of the second storage system 102-2.

Although each storage system 102-1 or 102-2 is depicted with multiple storage devices, in other examples, the storage system 102-1 or 102-2 can include just one storage device.

In other examples, the first storage system 102-1 can include multiple storage volumes and/or the second storage system 102-2 can include multiple storage volumes. Techniques or mechanisms according to some implementations of the present disclosure can be applied in the context of a single storage volume in each storage system 102-1 and 102-2, or in the context of multiple storage volumes in each storage system 102-1 and 102-2.

The first storage volume 116-1 and the second storage volume 116-2 can be part of an active-active synchronized collection of storage volumes, in which both the first storage volume 116-1 and the second storage volume 116-2 are in the active state and thus can be accessed by host systems, including 104-1 and 104-2 in FIG. 1A.

In the active-active synchronized collection of storage volumes, the first storage volume 116-1 is synchronized with the second storage volume 116-2, by which the first storage volume 116-1 and the second storage volume 116-2 maintain copies of the same data, where any update of data in the first storage volume 116-1 would be propagated to the second storage volume 116-2, and vice versa.

More generally, a group of storage volumes in the first storage system 102-1 can be synchronized with respect to a group of storage volumes in the second storage system 102-2, and each group of storage volumes is in the online state to allow access by host systems.

During normal operations (e.g., when the inter-site communication fabric 106 is not exhibiting anomalous behavior such as errors or faults), a communication path between the host system 104-1 and the first storage system 102-1 over the local communication fabric 150-1 is an optimized path, while a communication path between the host system 104-1 and the second storage system 102-2 over the local communication fabric 150-2 and the inter-site communication fabric 106 is a non-optimized path. Similarly, a communication path between the host system 104-2 and the second storage system 102-2 over the local communication fabric 150-2 is an optimized path, while a communication path between the host system 104-2 and the first storage system 102-1 over the local communication fabric 150-1 and the inter-site communication fabric 106 is a non-optimized path.

In some examples, a communication path from the host system 104-1 to a storage volume in the first storage system 102-1 can be referred to as an active, optimized (AO) path, while a communication path from the host system 104-1 to a storage volume in the second storage system 102-2 can be referred to as an active, nonoptimized (AN) path. Similarly, a communication path from the host system 104-2 to a storage volume in the second storage system 102-2 can be referred to as an AO path, while a communication path from the host system 104-2 to a storage volume in the first storage system 102-1 can be referred to as an AN path. Generally, a host system favors issuing I/O accesses over an AO path rather than an AN path. In some examples, attribute information can be associated with each communication path from a given host system to respective storage volumes so that the given host system is aware which communication path is an AO path and which communication path is an AN path.

During normal operation, a host system would not issue I/O requests over an AN path. However, if an event were to occur where an AO path is not available at any given point in time, the host system can issue I/O requests over an AN path.

FIG. 1A also shows a first recovery synchronization engine 112-1 in the first storage system 102-1, and a second recovery synchronization engine 112-2 in the second storage system 102-2. The recovery synchronization engines 112-1 and 112-2 can perform synchronization of data between the first storage volume 116-1 and the second storage volume 116-2 following recovery from an unavailable state of the inter-site communication fabric 106 between the first and second storage systems 102-1 and 102-2.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The inter-site communication fabric 106 (or more generally, a communication link) is in an "unavailable" state if an error or fault renders the inter-site communication fabric 106 (or more generally, a communication link) inoperative or unstable. A communication link is inoperative if data cannot be transmitted over the communication link, or data errors on the communication link render any transmitted data unreliable. A communication link is unstable if the communication link intermittently is inoperative between time periods where the communication link is operative. In other examples, a user or another entity may indicate that the communication link is unavailable, such as by sending notifications to the storage systems 102-1 and 102-2.

As discussed further below, the recovery synchronization engines 112-1 and 112-2 can coordinate the synchronization of storage volumes of an active-active synchronized collection of storage volumes following recovery of the inter-site communication fabric 106 from an unavailable state.

The first storage system 102-1 includes a storage controller 108-1, and the second storage system 102-2 includes a storage controller 108-2. A storage controller manages access of the data of storage volumes in a storage system in response to commands (read commands, write commands, etc.) from a host system.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In some examples, the first recovery synchronization engine 112-1 can be part of or separate from the first storage controller 108-1, and the second recovery synchronization engine 112-2 can be part of or separate from the second storage controller 108-2.

The first storage system 102-1 includes a cache 120-1 that can be used to store write data for write requests. More generally, the cache 120-1 can be used for both read caching and write caching. With read caching, data in the cache 120-1 can be used to satisfy a read request from the host system 104-1, such that retrieval of the read data from a slower storage device (e.g., the storage devices 114-1 or 114-2) does not have to be performed. With write caching, write data to be written to a storage device (e.g., the storage devices 114-1 and/or 114-2) can be first stored in the cache 120-1, for later writing to the storage device.

The second storage system 102-2 similarly includes a cache 120-2.

A "cache" can refer to a memory that stores data that is (or will be) stored in another storage, such as the storage devices 114-1 of the first storage system 102-1 and/or the storage devices 114-2 of the second storage system 102-2. A cache can be implemented using a number of memory devices (e.g., one memory device or multiple memory devices), including a volatile memory device such as a dynamic random access memory (DRAM) device or a static random access memory (SRAM) device, and/or a nonvolatile memory device such as a flash memory device.

FIG. 1A further shows a proxy 122-1 in the first storage system 102-1 and a proxy 122-2 in the second storage system 102-2. The function of the proxies 122-1 and 122-2 is discussed further below.

FIG. 1A further shows that the first storage system 102-1 maintains a first tracking metadata 118-1 for the first storage volume 116-1, and the second storage system 102-2 maintains a second tracking metadata 118-2 for the second storage volume 116-2. The first tracking metadata 118-1 can be stored in the storage devices 114-1 and/or a memory (not shown) of the first storage system 102-1, and the second tracking metadata 118-2 can be stored in the storage devices 114-2 and/or a memory (not shown) of the second storage system 102-2. A "memory" can be implemented with a memory device or multiple memory devices.

A tracking metadata (118-1 or 118-2) is used to track updates made to the corresponding storage volume (116-1 or 116-2, respectively), such as when the inter-site communication fabric 106 is unavailable (the inter-site communication fabric 106 in in an unavailable state).

In some examples, a storage volume (e.g., 116-1 or 116-2) can be divided into data extents. A "data extent" can refer to a segment of the storage volume of a given size. The tracking metadata associated with the storage volume can include indicators for respective data extents of the storage volume. An indicator in the tracking metadata can have a first value to indicate that a respective data extent in one storage volume has been modified with respect to another storage volume, and an indicator in the tracking metadata can have a second value (different from the first value) to indicate that a respective data extent in one storage volume has not been modified with respect to another storage volume.

In some examples, the tracking metadata is in the form of a bitmap that includes an array of tracking bits, where each tracking bit is an example of an indicator noted above. A tracking bit of the bitmap when set to a first value (e.g., 0 or 1) indicates that a respective data extent in one storage volume has been modified with respect to another storage volume, and a tracking bit of the bitmap when set to a second value (e.g., 1 or 0) indicates that a respective data extent in one storage volume has not been modified with respect to another storage volume.

FIG. 1B shows an example of a tracking metadata 118-*i* (e.g., in the form of a tracking metadata index table) that is associated with a respective storage volume 116-*i*. In the example of FIG. 1B, the tracking metadata 118-*i* includes a bitmap that has a number of tracking bits 160-1, 160-2, . . . , 160-M (M 1) that correspond to respective data extents 162-1, 162-2, . . . , 162-M of the storage volume 116-*i*.

If a tracking bit 160-*j* (j=1 to M) is set to a first value (e.g., 0 or 1), then that indicates that the respective data extent 162-*j* has not been changed with respect to another storage volume, such as during a time that the inter-site communication fabric 106 is unavailable. However, if the tracking bit 160-*j* is set to a different second value (e.g., 1 or 0), then that indicates that the respective data extent 162-*j* has been changed (such as in response to a write from a host system) with respect to another storage volume, such as during a time that the inter-site communication fabric 106 is unavailable.

The tracking starts with all of the tracking bits 160-1 to 160-M in the tracking metadata (118-*i*) set to the first value (e.g., 0 or 1) at the time tracking is enabled. A tracking bit 160-*j* (j=1 to M) in the tracking metadata is changed to the different second value (e.g., 1 or 0) if the corresponding data extent 162-*j* (j=1 to M) (addressed by the tracking bit 160-*j*) is changed due to a host system write after enabling the tracking. A tracking bit 160-*j* can be changed once from its initial set value indicating that the extend has changed. It does not matter if the corresponding data extent 162-*j* is changed (via write) once or multiple times. A tracking bit 160-*j* indicates if the data extent 162-*j* is either changed or not.

FIG. 1C shows a different example of the tracking metadata 118-*i*. In the example of FIG. 1C, the tracking metadata 118-*i* includes multi-bit tracking indicators 164-1, 164-2, . . . , 164-M, which correspond to respective data extents 166-1, 166-2, . . . , 166-M of the corresponding storage volume 116-*i*. Using a multi-bit tracking indicator 164-*j* allows for tracking changes to sub-extents of each data extent 166-*j* of the storage volume 116-*i*. Each data extent of the storage volume 116-*i* is divided into sub-extents, and the multi-bit tracking indicator 164-*j* can be used to track changes made to the corresponding sub-extent of the data extent 166-*j* of the storage volume 116-*i*. In the example of FIG. 1C, the multi-bit tracking indicator 164-*j* is a two-bit indicator to track four sub-extents.

The ensuing refers to examples where it is assumed that a tracking metadata 118-*i* includes respective tracking bits 160-*j*. When the tracking metadata 118-*i* is created, all tracking bits 160-*j* are set to 0, for example. When the tracking indicator 118-*i* is activated, such as in response to detecting that the inter-site communication fabric 106 has become unavailable, any new write to a data extent 162-*j* (partial write or full write to the data extent 162-*j*) results in changing the corresponding tracking bit 160-*j* to 1. Once a tracking bit 160-*j* is set to 1, any future writes to the corresponding data extent 162-*j* will not result in any further changes to the tracking bit 160-*j* as long as the tracking metadata 118-*i* remains active.

In some examples, tracking metadata (e.g., tracking metadata index tables) for storage volumes can be created prior to actual operation of a storage environment that includes storage systems that include the storage volumes. Creating the tracking metadata may be a time-consuming process, especially for storage volumes with a relatively large number of data extents. By creating the tracking metadata ahead of time, recovery from unavailability of the inter-site communication fabric 106 can be expedited. Once a tracking metadata are created, the tracking metadata remains deactivated until the tracking metadata is activated to track changes to data extents, such as in response to detecting that the inter-site communication fabric 106 has become unavailable.

FIGS. 2A-2F illustrate an example of detecting that the inter-site communication fabric 106 has become unavailable, followed by subsequent recovery from the unavailability of the inter-site communication fabric 106.

A storage environment that includes the storage systems 102-1 and 102-2 can start in a healthy state, in which the local communication fabrics 150-1, 150-2 and the inter-site communication fabric 106 are available to the host systems 104-1 and 104-2. It is also assumed that the storage volumes 116-1 and 116-2 are fully functional and accessible, and that they are actively being synchronized with one another as the storage volumes 116-1 and 116-2 are updated in response to writes from the host systems 104-1 and 104-2.

In this healthy state, the host system 104-1 has an AO path 202 to the first storage volume 116-1, and an AN path 206 to the second storage volume 116-2, and the host system 104-2 has an AO path 208 to the second storage volume 116-2, and an AN path 204 to the first storage volume 116-1.

Figure 2A:
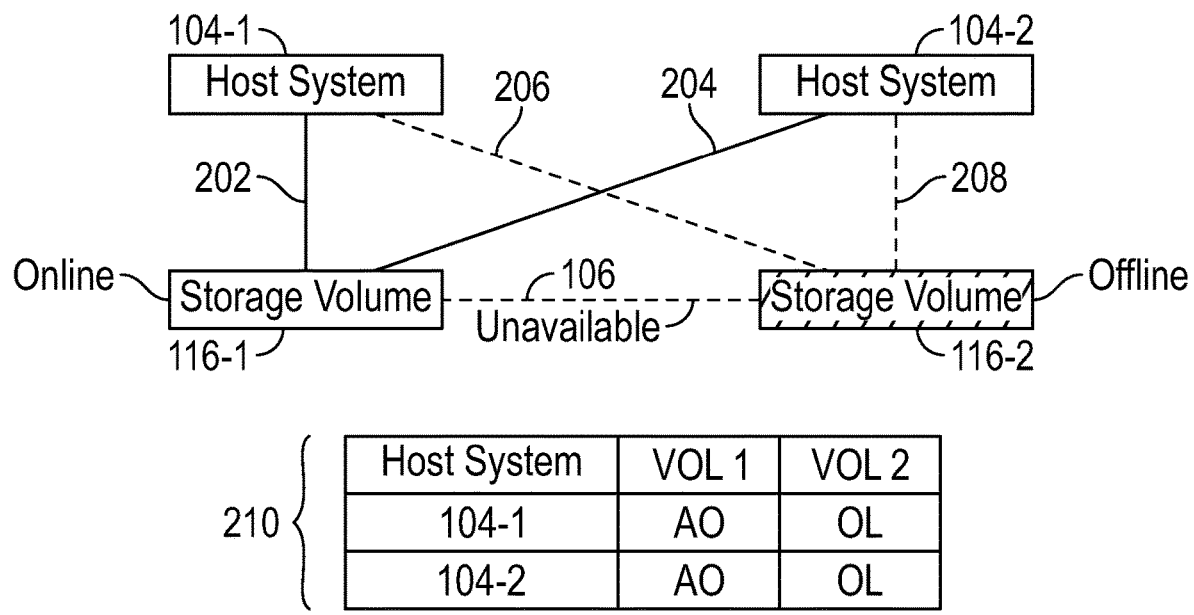
FIGS. 2A-2F are block diagrams illustrating a synchronization process responsive to recovery of a communication link between storage systems, in accordance with some examples.

Once the recovery synchronization engines 112-1 and 112-2 detect that the inter-site communication fabric 106 has become unavailable as shown in FIG. 2A, the second recovery synchronization engine 112-2 can, according to a specified policy, transition the second storage volume 116-2 to an offline state. According to the specified policy, the first recovery synchronization engine 112-1 can maintain the first storage volume 116-1 in the active state. In other examples, the first storage volume 116-1 can be transitioned to the offline state, while the second storage volume 116-2 is maintained in the online state.

The recovery synchronization engines 112-1 and 112-2 can update attribute information (e.g., 210 in FIG. 2A) to indicate the following: the second storage volume 116-2 (VOL2) is in the offline (OL) state for both host systems 104-1 and 104-2, and both host systems 104-1 and 104-2 have AO paths to the first storage volume 116-1 (VOL1). As shown in FIG. 2A, the communication path 206 from the host system 104-1 to the second storage volume 116-2, and the communication path 208 from the host system 104-2 to the second storage volume 116-2 are both offline (indicated by dashed lines).

Note that a copy of the attribute information 210 can be maintained at each respective storage system 102-1 and 102-2.

Read and write access of the first storage volume 116-1 is permitted from the host systems 104-1 and 104-2.

In the state shown in FIG. 2A, the host system 104-2 is forced to use the communication path 204 that has a higher latency (as compared to the communication path 208 that is now offline). In the state shown in FIG. 2A, the read access performance of the host system 104-1 remains unchanged as the host system 104-1 continues to access the first storage volume 116-1 locally over the local communication fabric 150-1 (FIG. 1). Note that the write performance of the host system 104-1 in the state shown in FIG. 2A may be improved as compared to normal operations since writes from the host system 104-1 are not duplexed to the second storage volume 116-2 for maintaining synchronization between the first and second storage volumes 116-1 and 116-2.

However, the read performance of the host system 104-2 is reduced since the communication path 204 has a higher latency. The write performance of the host system 104-2 may be negatively impacted due to the higher latency of the communication path 204, but this negative impact may be offset by a reduction in write time due to writes not having to be duplexed to two storage volumes for maintaining synchronization.

Figure 2B:
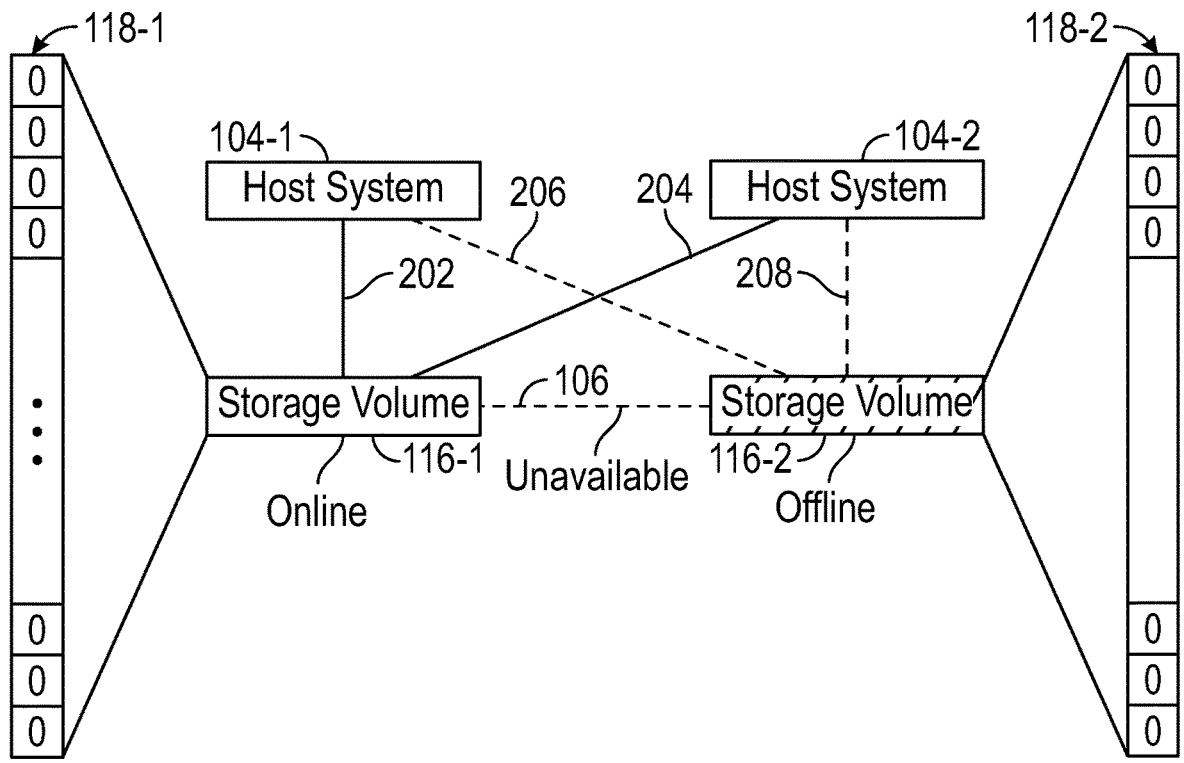

As shown in FIG. 2B, in response to detecting that the inter-site communication fabric 106 has become unavailable, the first recovery synchronization engine 112-1 can activate the first tracking metadata 118-1, and the second recovery synchronization engine 112-2 can activate the second tracking metadata 118-2 (assuming that the tracking metadata 118-1 and 118-2 were already created). When initially activated, the tracking bits of the first tracking metadata 118-1 are all 0s, and the tracking bits of the second tracking metadata 118-2 are all 0s, to indicate that the storage volumes 116-1 and 116-2 contain the same data at the time that the inter-site communication fabric 106 first became unavailable.

The attribute information 210 remains the same in the state shown in FIG. 2B.

Since the first storage volume 116-1 remains in the online state, data in the first storage volume 116-1 can change (and thus the first tracking metadata 118-1 can be updated). However, data in the second storage volume 116-2 (that is offline) does not change, and as a result, the second tracking metadata 118-2 would not be updated based on writes from host systems since such writes are not allowed.

Figure 2C:
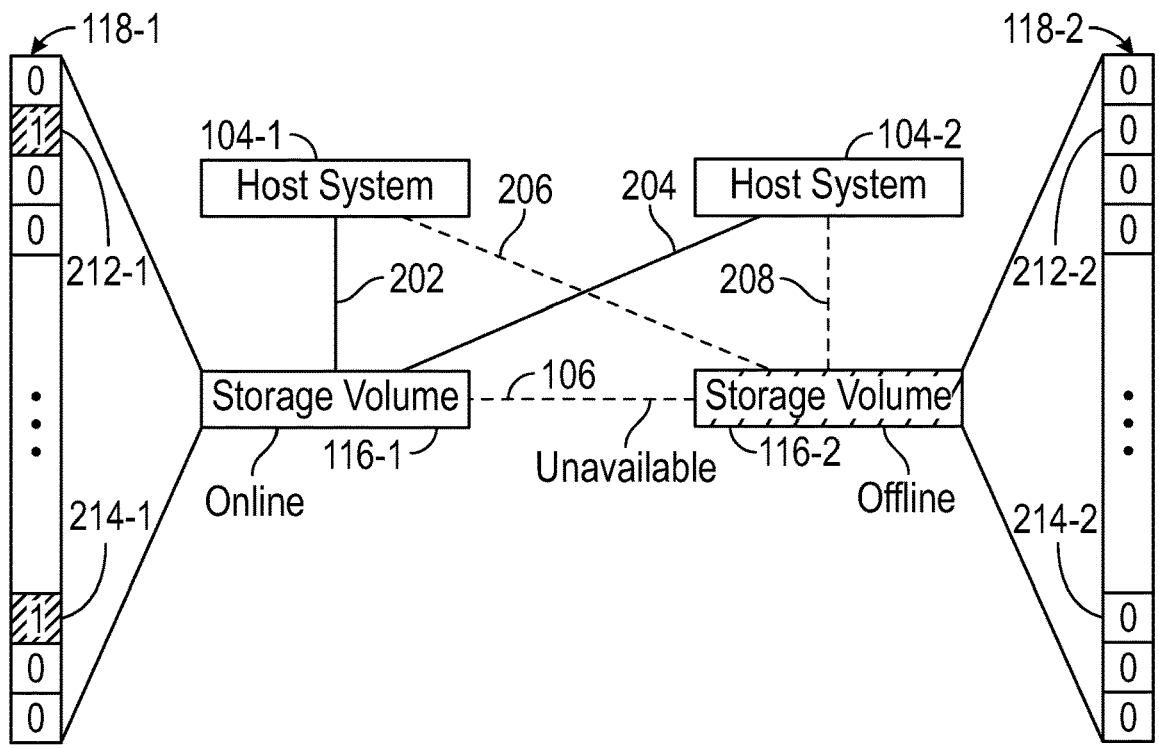
Figure 2D:
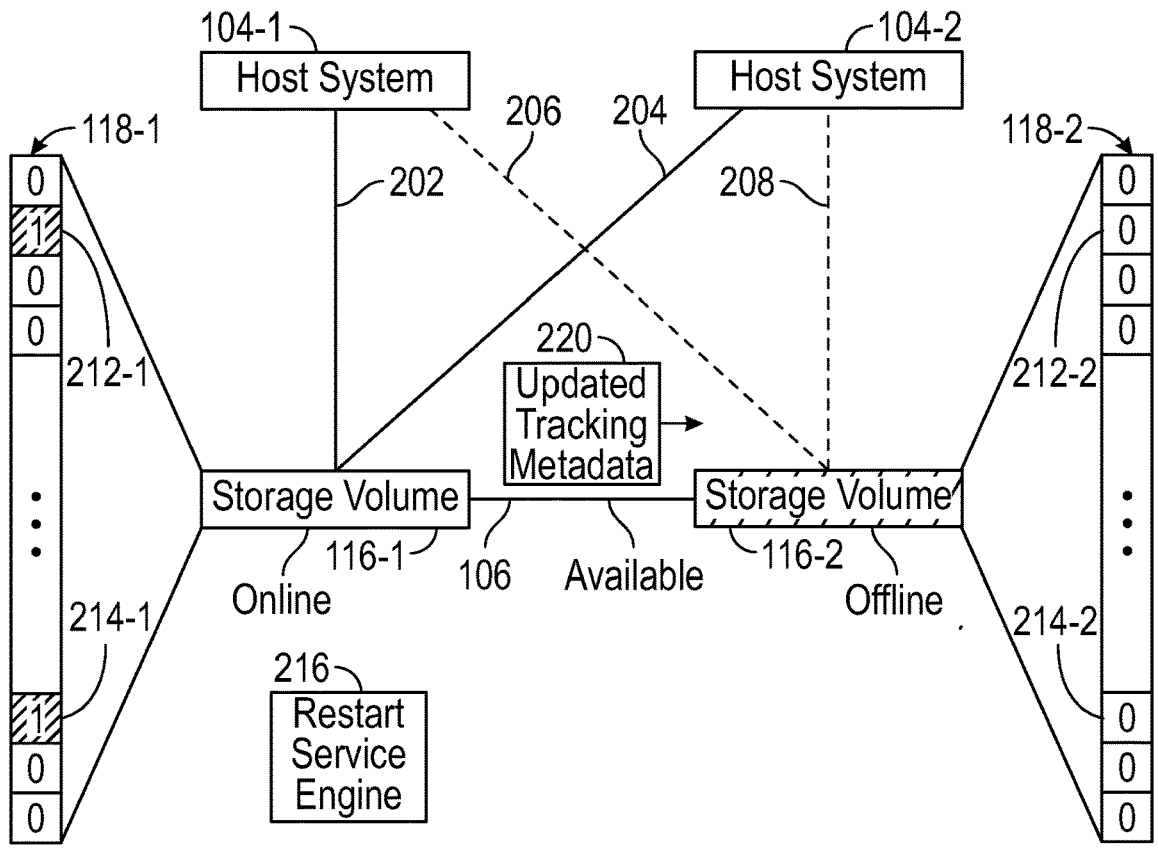

As shown in FIG. 2C, as writes are received (from the host system 104-1 and/or 104-2) for the first storage volume 116-1, data extents in the first storage volume 116-1 are changed. In the example of FIG. 2D, tracking bits 212-1 and 214-1 in the first tracking metadata 118-1 are updated to 1 to reflect that corresponding data extents in the first storage volume 116-1 have been updated by the writes.

The number of tracking bits in the first tracking metadata 118-1 can increase over time as more writes are received for the first storage volume 116-1.

FIG. 2D shows a state of the storage environment in which the inter-site communication fabric 106 has become operative (available). The recovery synchronization engine 112-1 and 112-2 can detect that the inter-site communication fabric 106 has become available. Alternatively, a user or another entity may notify the recovery synchronization engine 112-1 and 112-2 that the inter-site communication fabric 106 has become available.

When the inter-site communication fabric 106 becomes available, the first recovery synchronization engine 112-1 of the storage system 116-1 hosting the active storage volume 116-1 can initiate a restart service engine 216 to initiate a recovery from the unavailability of the inter-site communication fabric 106.

In some examples, the restart service engine 216 can be part of the first storage controller 108-1. In other examples, the restart service engine 216 can be separate from the first storage controller 108-1.

The restart service engine 216 sends (over the inter-site communication fabric 106) updated tracking metadata 220 from the first storage system 102-1 to the second storage system 102-2. In some examples, the updated tracking metadata 220 is delta tracking metadata in which just changed portions of the tracking metadata 118-1 are included in the delta tracking metadata. In the example of FIG. 2D, the changed portions include just the tracking bits 212-1 and 214-1, so that the delta tracking metadata would include just the tracking bits 212-1 and 214-1 without including the remaining tracking bits of the tracking metadata 118-1.

In other examples, the updated tracking metadata 220 can include the entirety of the tracking metadata 118-1. In further examples, the updated tracking metadata 220 can be a delta tracking metadata that is "self-describing," i.e., the self-describing tracking metadata can identify sub-extents of each data extent that have changed and sub-extents of each data extent that have not changed. For example, the self-describing tracking metadata can include multi-bit tracking indicators as shown in FIG. 1C, where the multiple tracking bits correspond to respective sub-extents.

In the state of FIG. 2D, the second storage volume 116-2 remains offline. The attribute information 210 continues to apply in the state of FIG. 2D.

Figure 2E:
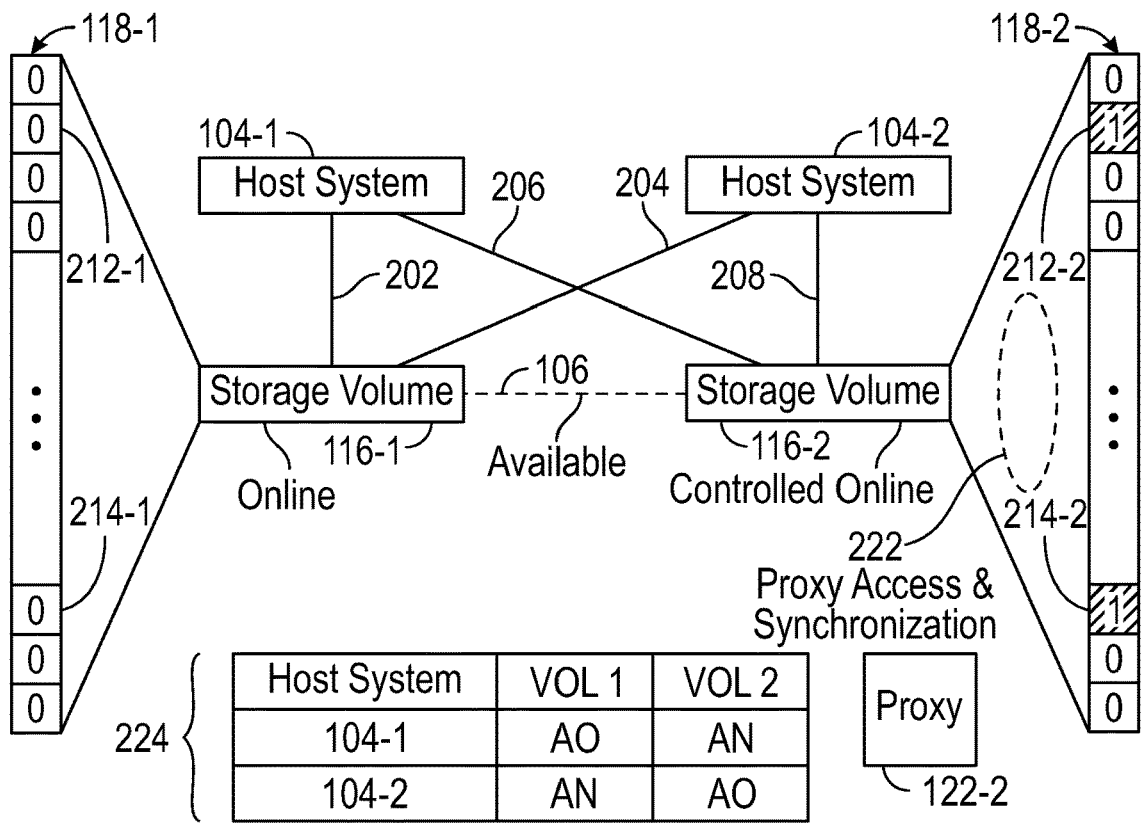

As shown in FIG. 2E, the second recovery synchronization engine 112-2 has updated the second tracking metadata 118-2 based on the received update tracking metadata 220. In FIG. 2E, a tracking bit 212-2 and a tracking bit 214-2 are updated to the value 1 based on the tracking bit 212-1 and the tracking bit 214-1 that were updated in the first tracking metadata 118-1.

After the first storage system 102-1 sends the update tracking metadata 220 to the second storage system 102-2, the first recovery synchronization engine 112-1 can reset the first tracking metadata 118-1 to all 0s to indicate that the first storage volume 116-1 has been synchronized with respect to the second storage volume 116-2 (even though actual synchronization has not yet occurred).

Additionally, the recovery synchronization engines 112-1 and 112-2 can update attribute information as shown at 224 in FIG. 2E. The attribute information 224 indicates that both the storage volumes (VOL1 and VOL2) are online, and that: the communication path from the host system 104-1 to the first storage volume 102-1 (VOL1) is an AO path, the communication path from the host system 104-1 to the second storage volume 102-2 (VOL2) is an AN path, the communication path from the host system 104-2 to the first storage volume 102-1 is an AN path, and the communication path from the host system 104-1 to the first storage volume 102-1 is an AO path.

The second recovery synchronization engine 112-2 can send a message or other indication to the first storage system 102-1 to cause the first recovery synchronization engine 112-1 to update the attribute information (224) at the first storage system 102-1. For example, the message is a message to update the active-active status of the active-active synchronized collection of storage volumes, which can be sent by the second recovery synchronization engine 112-2 in response to updating the second tracking metadata 118-2 based on the update tracking metadata 220.

In response to this message, first recovery synchronization engine 112-1 can update the attribute information (224), and the first storage system 102-1 can momentarily suspend access of the first storage volume 116-1, and can send the data of all data extents that have been updated since the delta tracking metadata 220 was sent to the second storage system 102-2. Note that the quantity of data extents changed in the second storage volume 116-2 since the update tracking metadata 220 was sent to the second storage system 102-2 can be relatively small.

The foregoing constitutes a handshake between the first and second recovery synchronization engines 112-1 and 112-2 (the handshake incudes the message from the second recovery synchronization engine 112-2 to the first recovery synchronization engine 112-1, and subsequent information sent from the first recovery synchronization engine 112-1 to the second recovery synchronization engine 112-2). In response to the handshake, the second recovery synchronization engine 112-2 transitions the storage volume 116-2 from the offline state to the controlled online state. At this stage, all data extents that are unmodified in the storage volume 116-2 can be locally accessed (from the host system 104-2), but the modified data extents corresponding to tracking bits 212-2 and 214-2 cannot be accessed, and any access of these modified data extents are redirected (proxied) to the storage volume 116-1 (discussed further below).

As shown in FIG. 2E, following the update of the second tracking metadata 118-2 based on the update tracking metadata 220, the second recovery synchronization engine 112-2 can perform a process 222 in which synchronization (e.g., in the background) of changed portions of the first storage volume 116-1 (relative to the second storage volume 116-2) are used to update the second storage volume 116-2.

The synchronization of data extents between the first storage volume 116-1 and the second storage volume 116-2 can be accomplished in one of several ways. In some examples, the second recovery synchronization engine 112-2 can pull the modified data extents (as indicated by the second tracking metadata 118-2) from the first storage volume 116-1. In other examples, the first recovery synchronization engine 112-1 pushes the modified data extents (such as based on the updated tracking metadata 220) from the first storage volume 116-1 to the second storage volume 116-2.

Figure 2F:
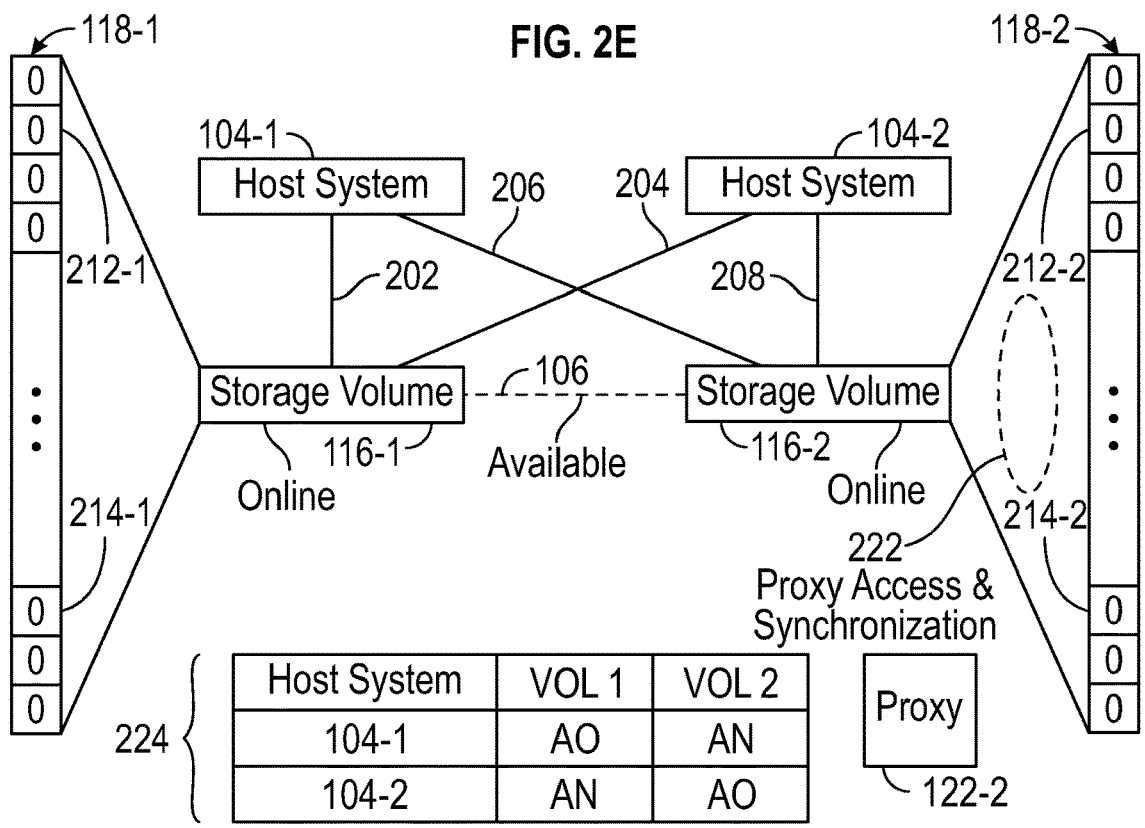

As data extents in the second storage volume 116-2 are synchronized, the corresponding tracking bit in the second tracking metadata 118-2 can be reset to 0, as shown in FIG. 2F.

Transitioning of the second storage volume 116-2 to the controlled online state opens read and write access of the second storage volume 116-2. More specifically, the second storage controller 108-2 allows access of data extents of the second storage volume 116-2 indicated as unmodified by respective tracking bits (e.g., set to 0) of the second tracking metadata 118-2. However, the second storage controller 108-2 blocks access of any data extent of the second storage volume 116-2 indicated as modified (e.g., set to 1) by a respective tracking bit of the second tracking metadata 118-2.

The blocking of access to a given data extent indicated as modified can trigger a resynchronization recovery process in which the proxy 122-2 obtains the given data extent from the first storage volume 116-1. In some examples, this given data extent can be obtained out of order with respect to an order of synchronization of data extents of the synchronization process. As an example, the synchronization process may synchronize data extents in a particular order. The resynchronization recovery process can obtain the given data extent earlier than would have been obtained by the particular order. Note that the proxy 122-1 can perform similar tasks in another example where the synchronization process is in the reverse direction in which the second storage volume 116-2 remains online while the first storage volume 116-1 is transitioned offline.

The process 222 further includes a proxy access of the first storage volume 116-1. With proxy access, in response to an access (read or write) of a changed portion of the second storage volume 116-2 (as represented by the second tracking metadata 118-2), the second recovery synchronization engine 112-2 can proxy the access to the first storage volume 116-1. Specifically, the proxy of the access includes: 1) in response to receiving the access request of the changed portion of the second storage volume 116-2, the second recovery synchronization engine 112-2 forwards (as a data requester) the access request to the first storage system 102-1, 2) the first storage controller 108-1 in the first storage system 102-1 obtains the data targeted by the access request (note that the obtained data is the data that was modified at the first storage volume 116-1 but not yet synchronized with the second storage volume 116-2), and 3) the first storage system 102-1 sends the obtained data to the second storage system 102-2. For a read request, the second storage system 102-2 returns the obtained data to the host system that submitted the read request. Also, the corresponding tracking bit in the second tracking metadata 118-2 can be reset to 0.

If a host system issues a write request to the second storage volume 116-2 in the controlled online state, and the write request is a request to write a blocked data extent (a modified data extent in the second storage volume 116-2 as indicated by a tracking bit in the second tracking metadata 118-2), the second storage controller 108-2 stores the write data in the cache 120-2 (without updating the second storage volume 116-2 in the storage devices 114-2).

Additionally, the second recovery synchronization engine 112-2 can send a copy of the write request to the first storage system 102-1 to access the corresponding data extent from the first storage volume 116-1. At this point, the second storage controller 108-2 can acknowledge the write request to the host system that issued the write request (indicating that the write has been completed even though the write data is in the cache 120-2 but not in the second storage volume 116-2).

When the requested data extent is received at the second storage system 102-2, the second storage system 102-2 can merge the write data of the write request from the cache 120-2 with the data extent obtained from the first storage volume 116-1. The merging produces an updated data extent that can be written to the second storage volume 116-2 in the storage devices 114-2. The corresponding tracking bit in the second tracking metadata 118-2 can then be reset to 0.

Note that in cases where a write request is received for a data extent associated with a tracking bit (in a respective tracking metadata) set to 0, the tracking bit will not be set to 1 since mirroring is being performed to maintain synchronization between the first and second storage volumes 116-1 and 116-2; in other words, the write performed at the second storage volume 116-2 in response to the write request is mirrored to the first storage volume 116-1 as part of the active-active synchronization between the first and second storage volumes 116-1 and 116-2.

When all tracking bits of the second tracking metadata 118-2 has been reset to 0, as shown in FIG. 2F, the first and second storage volumes 116-1 and 116-2 are fully restored and synchronized following the recovery from the inter-site communication fabric 106 being in the unavailable state. Also, the storage volume 116-2 is in a "normal" online state where all data extents of the storage volume 116-2 are locally accessible by the host system 104-2. At this point, the first and second tracking metadata 118-1 and 118-2 are deactivated.

Figure 3:
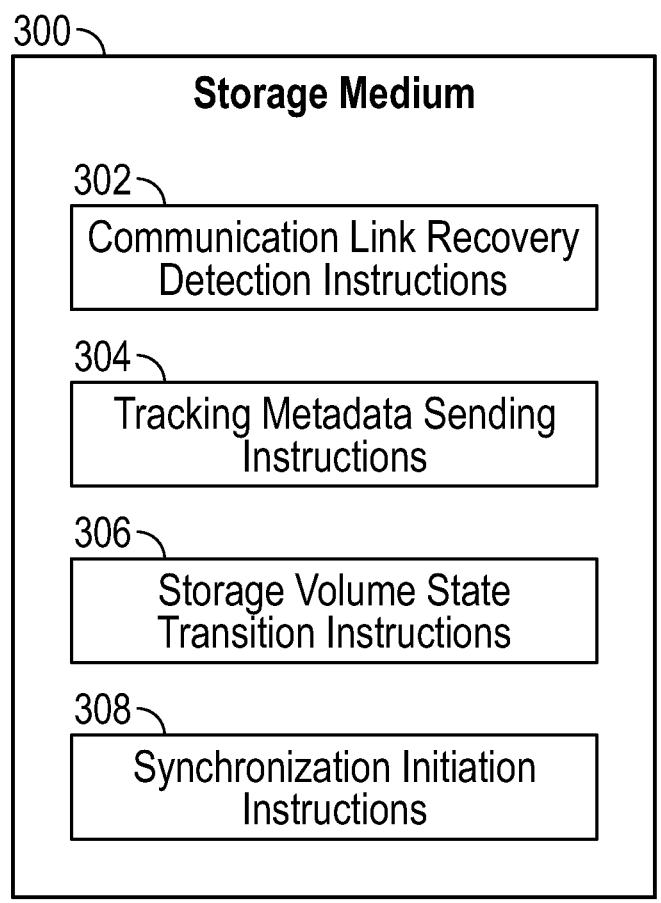
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include the storage systems of FIG. 1, for example.

The machine-readable instructions include communication link recovery detection instructions 302 to detect recovery, from an unavailable state, of a communication link between a first storage system that includes a first storage volume and a second storage system that includes a second storage volume that is to be a synchronized version of the first storage volume, where while the communication link is in the unavailable state the second storage volume is in an offline state and the first storage volume is in an online state.

The machine-readable instructions include tracking metadata sending instructions 304 to, in response to detecting the recovery of the communication link, send a first tracking metadata for the first storage volume from the first storage system to the second storage system. In some examples, the first tracking metadata that is sent can include a subset less than all of the tracking indicators used to track modified data portions of the first storage volume (e.g., a delta tracking metadata as noted above). In other examples, the first tracking metadata that is sent can include all of the tracking indicators used to track modified data portions of the first storage volume.

The machine-readable instructions include instructions 306 and 308 that are to perform tasks in response to receipt of the first tracking metadata at the second storage system that maintains a second tracking metadata for the second storage volume.

The instructions 306 include storage volume state transition instructions to transition the second storage volume from the offline state to a controlled online state.

The instructions 308 include synchronization initiation instructions to initiate a synchronization process to synchronize the second storage volume with the first storage volume while the second storage volume is in the controlled online state.

In some examples, the second storage volume in the controlled online state is accessible by a data requester (e.g., a host system or a program in the host system) while the synchronization process is active and a portion of the second storage volume is unsynchronized with respect to the first storage volume. This allows quicker access of the data of the second storage volume following recovering from the communication link being in the unavailable state. In the controlled online state, stale data in the second storage volume would not be accessible, and any access attempt of such stale data would be redirected (proxied) to the first storage volume.

In some examples, the second tracking metadata is updated at the second storage system based on the first tracking metadata. This allows a determination of which data portions in the second storage volume are modified with respect to the first storage volume, and to allow for control of access so that stale data is not used to process an I/O request from a data requester.

In some examples, the second storage system receives a request to access a segment of the second storage volume while the second storage volume is in the controlled online state; and determines, based on the updated second tracking metadata, whether the segment is part of the portion of the second storage volume that is unsynchronized with respect to the first storage volume. This blocks access of stale data in the second storage volume.

In some examples, in response to determining that the segment is part of the portion of the second storage volume that is unsynchronized with respect to the first storage volume, the second storage system sends the request to the first storage system to retrieve data of the segment from the first storage volume. In response to receiving, at the second storage system, the data of the segment from the first storage volume, the second storage system updates the second storage volume with the data in the segment, and updates the second tracking metadata to indicate that the segment is valid in the second storage volume. This brings the segment in the second storage volume into synchronization with the first storage volume.

In some examples, the first storage system sends, to the second storage system, write data of a write request for updating the first storage volume, and the second storage system merges the write data with the data of the segment received from the first storage volume. This allows the write to be properly processed so that portions updated are merged with portions that are not updated by the write request.

In some examples, the synchronization process is to synchronize segments in the second storage volume according to an order, and where the updating of the second storage volume with the data in the segment causes an update of the segment that is out-of-order with respect to the order of the synchronization process. This allows a request to be updated more quickly without having to wait for the synchronization process to be completed.

In some examples, the first tracking metadata and the second tracking metadata are activated in response to detecting that the communication link is in the unavailable state. In this way, the tracking metadata are used when the communication link is unavailable, and not used when the communication link is available, since mirroring is performed during normal operation to maintain synchronization of the first and seconds storage volumes.

In some examples, the unavailable state of the communication link is due to the communication link being unstable and intermittently losing connectivity. Techniques or mechanisms according to some implementations of the present disclosure can be applied both in cases where the communication link is down for a relatively long period of time, and when the communication link is intermittently operative and inoperative.

In some examples, the sending of the first tracking metadata from the first storage system to the second storage system includes sending a changed portion of the first tracking metadata without sending an unhanged portion of the first tracking metadata. This reduces the amount of tracking metadata that has to be sent between storage systems.

In some examples, the first tracking metadata includes indicators of whether data extents in the first storage volume have been updated, and information indicating which sub-extents of each data extent have been updated. The sending of the first tracking metadata from the first storage system to the second storage system including sending at least a portion of the indicators and the information, where the information can be used to specifically identify sub-extents that are modified and sub-extents that are not modified.

Figure 4:
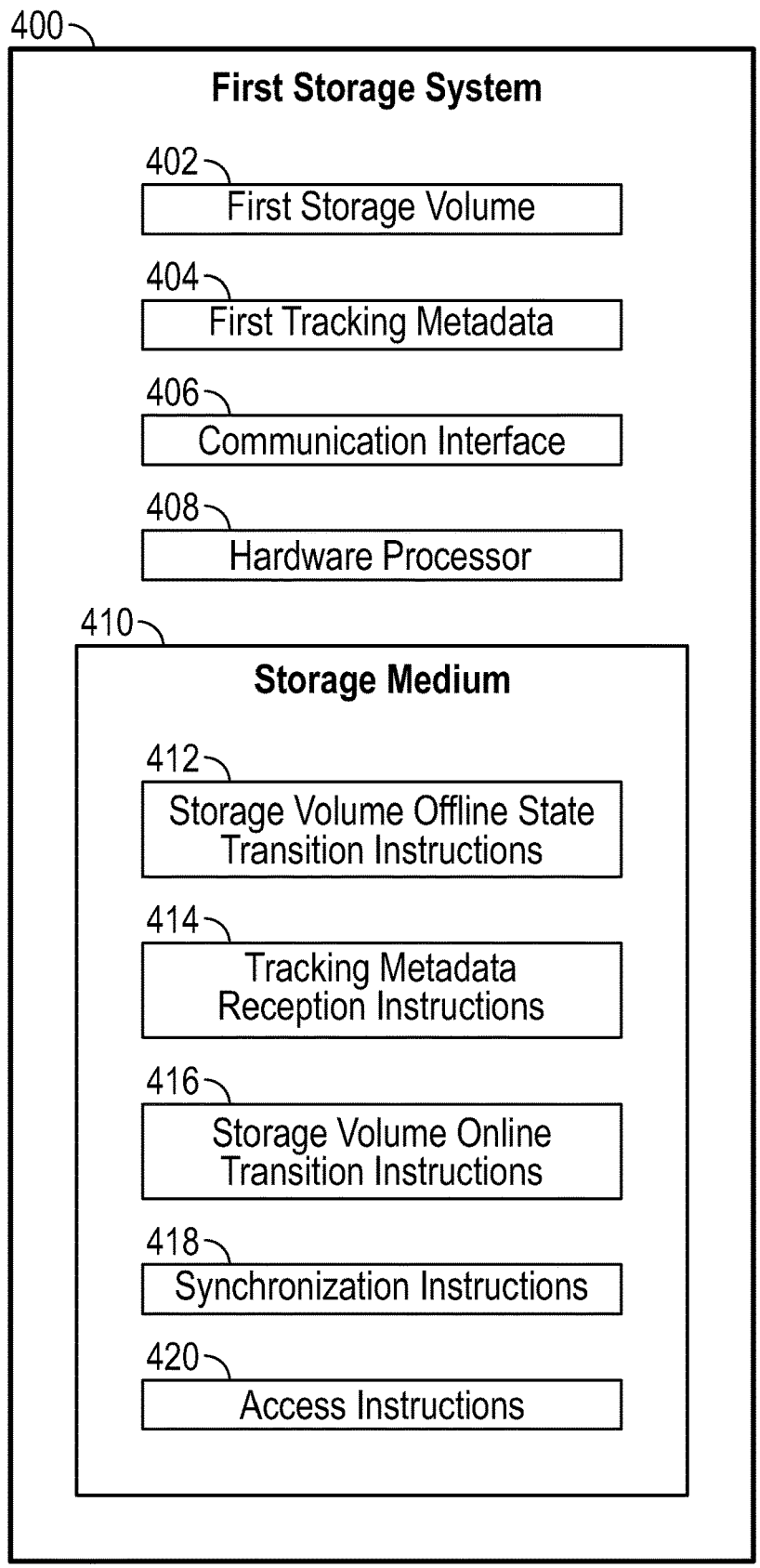
FIG. 4 is a block diagram of a storage system according to some examples.

FIG. 4 is a block diagram of a first storage system 400 to store a first storage volume 402 and a first tracking metadata 404 for the first storage volume 492, Note that the first storage system 400 of FIG. 4 can be the second storage system 102-2 of FIG. 1A.

The first storage system 400 includes a communication interface 406 to communicate with a second storage system that stores a second storage volume to be synchronized with the first storage volume.

The first storage system 400 includes a hardware processor 408 (or multiple hardware processors). A hardware processor can include a microprocessor, a core of a multi-core microprocessor, a microcontroller, a programmable integrated circuit, a programmable gate array, or another hardware processing circuit.

The first storage system 400 includes a storage medium 410 storing machine-readable instructions executable on the hardware processor 408 to perform various tasks.

The machine-readable instructions in the storage medium 410 include storage volume offline state transition instructions 412 to transition the first storage volume 402 to an offline state while a communication link between the first storage system 400 and the second storage system is in the unavailable state.

The machine-readable instructions in the storage medium 410 include tracking metadata reception instructions 414 to, responsive to a recovery, from the unavailable state, of the communication link, receive a second tracking metadata for the second storage volume from the second storage system.

The machine-readable instructions in the storage medium 410 include instructions 416, 418, and 420 to perform tasks in response to receipt of the second tracking metadata at the first storage system.

The instructions 416 include storage volume online transition instructions to transition the first storage volume 402 from the offline state to a controlled online state.

The instructions 418 include synchronization instructions to perform a synchronization process to synchronize the first storage volume 402 with the second storage volume.

The instructions 418 include access instructions to allow access of the first storage volume 402 by a data requester prior to completion of the synchronization process, while the first storage volume is in the controlled online state.

In some examples, the machine-readable instructions in the storage medium 410 include instructions to block access of a data portion in the first storage volume wherein the data portion is associated with a tracking indicator in the updated first tracking metadata indicating that the data portion is modified with respect to the second storage volume.

In some examples, the machine-readable instructions in the storage medium 410 include instructions to, responsive to the blocking of the access of the data portion, initiate an access of a respective data portion in the second storage volume to obtain the respective data portion from the second storage volume, and update data in the data portion in the first storage volume using the respective data portion obtained from the second storage volume.

Figure 5:
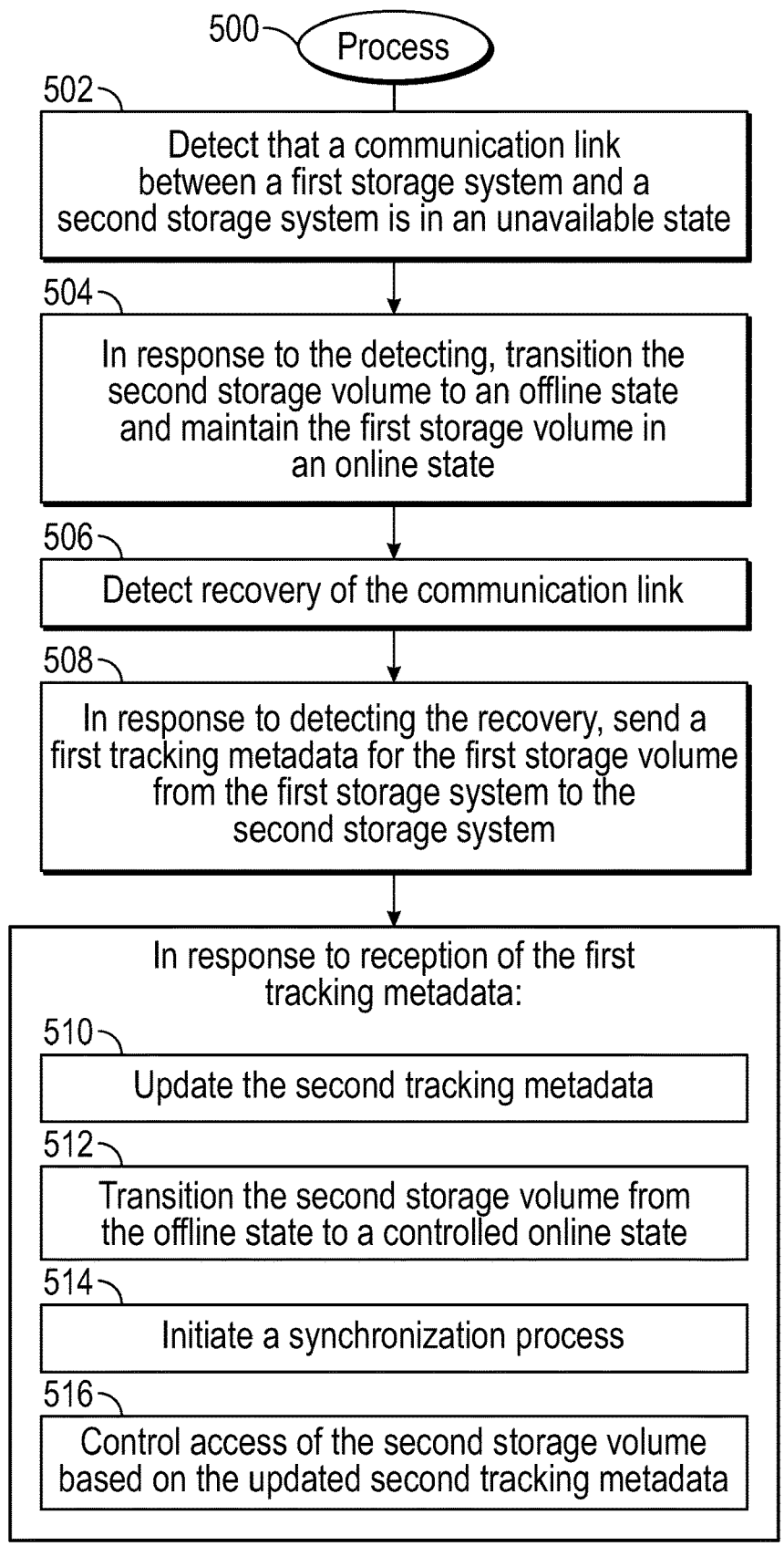
FIG. 5 is a flow diagram of a process according to some examples.

FIG. 5 is a flow diagram of a process 500 according to some examples. The process 500 includes detecting (at 502) that a communication link between a first storage system that includes a first storage volume and a second storage system that includes a second storage volume is in an unavailable state, where the second storage volume is to be synchronized with the first storage volume.

The process 500 includes, in response to the detecting, transitioning (at 504) the second storage volume to an offline state and maintaining the first storage volume in an online state.

The process 500 includes detecting (at 506) recovery, from the unavailable state, of the communication link.

The process 500 includes, in response to detecting the recovery of the communication link, sending (at 508) a first tracking metadata for the first storage volume from the first storage system to the second storage system.

The process 500 includes tasks 510, 512, 514, and 516 that are performed in response to receipt of the first tracking metadata at the second storage system that maintains a second tracking metadata for the second storage volume.

The task 510 updates the second tracking metadata based on the first tracking metadata. The task 512 transitions the second storage volume from the offline state to a controlled online state. The task 514 initiates a synchronization process to synchronize the second storage volume while in the controlled online state with the first storage volume. The task 516 controls access of the second storage volume based on the updated second tracking metadata while the synchronization process is ongoing.

A storage medium (e.g., 300 in FIG. 3 or 410 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

detect, by a first storage system, recovery from an unavailable state of a communication link between the first storage system that includes a first storage volume and a second storage system that includes a second storage volume that is to be a synchronized version of the first storage volume, wherein while the communication link is in the unavailable state the second storage volume is in an offline state and the first storage volume is in an online state, and wherein the first storage volume and the second storage volume are part of an active-active synchronized collection of storage volumes in which updates of data segments are synchronized across the storage volumes and in which a given data segment is accessible at each of the storage volumes of the active-active synchronized collection of storage volumes;

in response to detecting the recovery of the communication link, initiate, by the first storage system, a recovery process to synchronize the active-active synchronized collection of storage volumes by sending a first tracking metadata for the first storage volume in the online state from the first storage system to the second storage system that maintains a second tracking metadata for the second storage volume in the offline state; and in response to receipt of the first tracking metadata from the first storage system at the second storage system that maintains the second tracking metadata for the second storage volume:

update, at the second storage system, the second tracking metadata based on the first tracking metadata, transition the second storage volume from the offline state to a controlled online state, and initiate a synchronization process to synchronize the second storage volume with the first storage volume while the second storage volume is in the controlled online state.

2. The non-transitory machine-readable storage medium of claim 1, wherein the second storage volume in the controlled online state is locally accessible by a data requester while the synchronization process is active and a portion of the second storage volume is unsynchronized with respect to the first storage volume.

3. The non-transitory machine-readable storage medium of claim 2, wherein the instructions upon execution cause the system to:

transition, by the second storage system, the second storage volume from the online state to the offline state in response to the second storage system detecting that the communication link is in the unavailable state.

4. The non-transitory machine-readable storage medium of claim 2, wherein the instructions upon execution cause the system to:

receive, at the second storage system, a request to access a first data segment of the second storage volume while the second storage volume is in the controlled online state; and determine, at the second storage system based on the updated second tracking metadata, whether the first data segment is part of the portion of the second storage volume that is unsynchronized with respect to the first storage volume.

5. The non-transitory machine-readable storage medium of claim 4, wherein the instructions upon execution cause the system to:

in response to determining that the first data segment is part of the portion of the second storage volume that is unsynchronized with respect to the first storage volume, send, from the second storage system, the request to the first storage system to retrieve data of the first data segment from the first storage volume; and in response to receiving, at the second storage system, the data of the first data segment from the first storage volume, update the second storage volume with the data of the first data segment, and update the second tracking metadata to indicate that the first data segment is valid in the second storage volume.

6. The non-transitory machine-readable storage medium of claim 5, wherein the request is a write request to write the first data segment in the second storage volume, and wherein the instructions upon execution cause the system to:
send, from the second storage system to the first storage system, write data of the write request for updating the first storage volume; and
merge, at the second storage system, the write data with the data of the first data segment received from the first storage volume.

7. The non-transitory machine-readable storage medium of claim 5, wherein the synchronization process is to synchronize data segments in the second storage volume according to an order, and wherein the updating of the second storage volume with the data in the first data segment causes an update of the first data segment that is out-of-order with respect to the order of the synchronization process.

8. The non-transitory machine-readable storage medium of claim 1, wherein the instructions upon execution cause the system to:
activate the first tracking metadata and the second tracking metadata in response to detecting that the communication link is in the unavailable state.

9. The non-transitory machine-readable storage medium of claim 1, wherein the unavailable state of the communication link is due to the communication link being unstable and intermittently losing connectivity.

10. The non-transitory machine-readable storage medium of claim 1, wherein the sending of the first tracking metadata from the first storage system to the second storage system comprises sending a changed portion of the first tracking metadata without sending an unhanged portion of the first tracking metadata.

11. The non-transitory machine-readable storage medium of claim 1, wherein the first tracking metadata comprises:
indicators of whether data extents in the first storage volume have been updated, and
information indicating which blocks of each data extent have been updated, and
wherein the sending of the first tracking metadata from the first storage system to the second storage system comprises sending at least a portion of the indicators and the information.

12. A first storage system to store a first storage volume and a first tracking metadata for the first storage volume, the first storage system comprising:
a communication interface to communicate with a second storage system that stores a second storage volume to be synchronized with the first storage volume, wherein the first storage volume and the second storage volume are part of an active-active synchronized collection of storage volumes in which updates of data segments are synchronized across the storage volumes and in which a given data segment is accessible at each of the storage volumes of the active-active synchronized collection of storage volumes;
a processor; and
a non-transitory storage medium storing instructions executable on the processor to:
transition the first storage volume to an offline state while a communication link between the first storage system and the second storage system is in an unavailable state;
responsive to a recovery, from the unavailable state, of the communication link, receive a second tracking metadata for the second storage volume from the second storage system, the second storage volume in an online state while the communication link is in the unavailable state, and the second tracking metadata sent by the second storage system to initiate a recovery process to synchronize the active-active synchronized collection of storage volumes in response to a detection of the recovery of the communication link by the second storage system; and
in response to receipt of the second tracking metadata from the second storage system at the first storage system:
update, at the first storage system, the first tracking metadata based on the second tracking metadata,
transition the first storage volume from the offline state to a controlled online state,
perform a synchronization process to synchronize the first storage volume with the second storage volume, and
allow access of the first storage volume by a data requester prior to completion of the synchronization process, while the first storage volume is in the controlled online state.

13. The first storage system of claim 12, wherein the instructions are executable on the processor to:
block access of a data portion in the first storage volume while in the controlled online state wherein the data portion is associated with a tracking indicator in the updated first tracking metadata indicating that the data portion is modified with respect to the second storage volume.

14. The first storage system of claim 13, wherein the instructions are executable on the processor to:
responsive to the blocking of the access of the data portion, initiate an access of a respective data portion in the second storage volume to obtain the respective data portion from the second storage volume; and
update data in the data portion in the first storage volume using the respective data portion obtained from the second storage volume.

15. The first storage system of claim 12, wherein the second tracking metadata received from the second storage system comprises a delta tracking metadata that includes tracking indicators indicating modified data portions in the second storage volume, and excludes tracking indicators indicating unmodified data portions in the second storage volume.

16. The first storage system of claim 12, wherein the instructions are executable on the processor to:
detect that the communication link is in the unavailable state; and
in response to detecting that the communication link is in the unavailable state, activate the first tracking metadata that was previously inactive.

17. A method comprising:
detecting that a communication link between a first storage system that includes a first storage volume and a second storage system that includes a second storage volume is in an unavailable state, wherein the first storage volume and the second storage volume are part of an active-active synchronized collection of storage volumes in which updates of data segments are synchronized across the storage volumes and in which a given data segment is accessible at each of the storage volumes of the active-active synchronized collection of storage volumes;
in response to the detecting, transitioning the second storage volume to an offline state and maintaining the first storage volume in an online state;

detecting, by the first storage system, recovery, from the unavailable state, of the communication link;

in response to detecting the recovery of the communication link, initiating, by the first storage system, a recovery process to synchronize the active-active synchronized collection of storage volumes by sending a first tracking metadata for the first storage volume in the online state from the first storage system to the second storage system that maintains a second tracking metadata for the second storage volume in the offline state; and in response to receipt of the first tracking metadata from the first storage system at the second storage system that maintains the second tracking metadata for the second storage volume:

updating, at the second storage system, the second tracking metadata based on the first tracking metadata, transitioning the second storage volume from the offline state to a controlled online state, initiating a synchronization process to synchronize the second storage volume with the first storage volume, and controlling access of the second storage volume while in the controlled online state based on the updated second tracking metadata while the synchronization process is ongoing.

18. The method of claim 17, wherein the controlling of the access of the second storage volume comprises:

allowing access of a first data portion in the second storage volume indicated, by the updated second tracking metadata, as unmodified with respect to the first storage volume, and blocking access of a second data portion in the second storage volume indicated, by the updated second tracking metadata, as modified with respect to the first storage volume.

19. The method of claim 18, wherein the controlling of the access of the second storage volume comprises:

in response to blocking the access of the second data portion, forwarding a request to access data of the second data portion to the first storage system to obtain the data of the second data portion from the first storage volume.

\* \* \* \* \*